March 21, 1939.    A. E. ANDERSON    2,151,178
CONTROL SYSTEM
Filed April 28, 1938

Inventor:
Arvid E. Anderson,
by Harry E. Dunham
His Attorney.

Patented Mar. 21, 1939

2,151,178

UNITED STATES PATENT OFFICE 2,151,178

CONTROL SYSTEM

Arvid E. Anderson, Drexel Hill, Pa., assignor to General Electric Company, a corporation of New York Application April 28, 1938, Serial No. 204,761

24 Claims. (Cl. 172—289)

My invention relates to control systems for synchronous machines and particularly to systems for controlling a predetermined connection of a synchronous motor, synchronous condenser, synchronous converter or the like in response to a predetermined speed condition thereof. My invention is especially adapted for use in automatic control arrangements for applying field to a synchronous motor when it reaches a predetermined speed near synchronous speed and for removing field when the motor falls out of synchronism.

This application is a continuation in part of my copending application filed September 27, 1934, Serial No. 745,744.

One object of my invention is to provide an improved arrangement for controlling a predetermined connection of a synchronous machine in accordance with the frequency of the current pulsations produced in the armature circuit of the machine while the machine is operating out of synchronism.

Another object of my invention is to provide an improved arrangement for controlling during the starting operation of a synchronous machine a predetermined connection thereof in accordance with the frequency of the current pulsations produced in the armature circuit of the machine while the machine is operating at a subsynchronous speed.

Another object of my invention is to provide an improved arrangement for controlling during the starting operation of a synchronous machine a predetermined connection thereof in response to a predetermined function of the supply circuit voltage and the armature current of the machine.

Another object of my invention is to provide an improved arrangement for controlling the application of field to a synchronous machine when the machine reaches a predetermined speed near synchronous speed.

A further object of my invention is to provide an arrangement for respectively controlling the application and removal of field excitation to and from a synchronous machine in response to predetermined functions of the supply circuit voltage and the armature current of the machine.

My invention will be better understood from the following description when taken in connection with the accompanying drawing and its scope will be pointed out in the appended claims.

Figure 1:
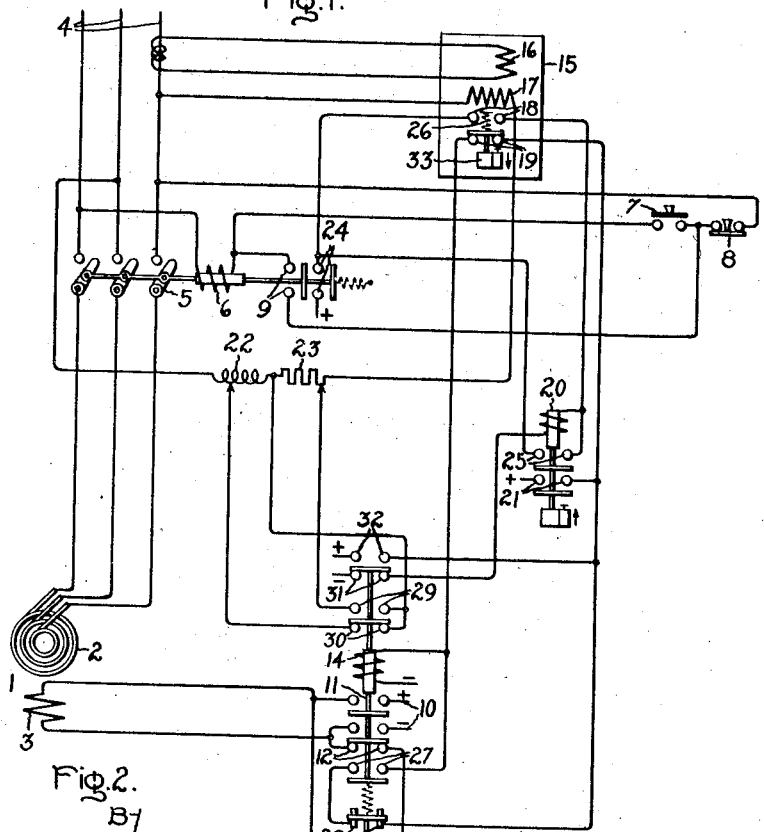
Figure 2:
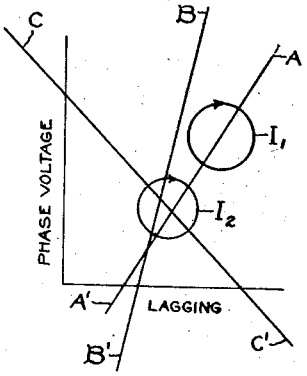
Figure 3:
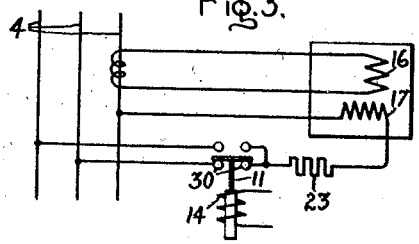
Figure 4:
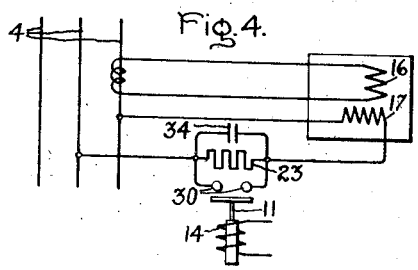

In the accompanying drawing, Fig. 1 illustrates diagrammatically an embodiment of my invention in connection with a synchronous motor control system, Fig. 2 is an explanatory vector diagram and Figs. 3 and 4 are modifications of a portion of the system shown in Fig. 1. In Fig. 1 of the accompanying drawing, I represents a synchronous motor having an armature 2 and a field winding 3. In order to simplify the disclosure, I have shown my invention in connection with a full voltage starting arrangement for a synchronous motor whereby the motor is started as an induction motor by connecting the motor armature winding directly to the alternating current supply circuit. It is to be understood, however, that my invention may be embodied in any other suitable control arrangement for effecting the starting of a motor. As shown in the drawing, the armature 2 is arranged to be connected directly to an alternating current supply circuit 4 by means of a suitable switch 5 having a closing coil 6 arranged to be connected across one phase of the supply circuit 4 when a suitable control switch 7 is closed. The control switch 7 may be controlled in any suitable manner, examples of which are well known in the art, so that it is closed when it is desired to start the motor 1. In the circuit of the closing coil 6, I also provide the normally closed contacts of a control switch 8, which is controlled in any suitable manner so that it is opened when it is desired to stop the motor. The switch 5, when closed, completes through its auxiliary contacts 9 a locking circuit for the closing coil 6 so that the control switch 7 may be opened without effecting the opening of the switch 5.

The field winding 3 of the motor 1 is arranged to be connected to a suitable source of excitation 10 by means of a suitable field switch 11 when it is closed. When the switch 11 is open, its auxiliary contacts 12 connect a suitable discharge resistor 13 across the terminals of the field winding 3.

In accordance with the embodiment of my invention shown in the drawing, I control the closing and the opening of the field switch 11 by means which is controlled by the current pulsations which occur in the armature circuit of the motor when it is operating out of synchronism. I have observed that when a synchronous machine, particularly a machine with salient field poles or a machine whose field winding is excited with direct current is operating near synchronism with the alternating current supply circuit supplying current to the armature winding of the machine, the armature current of the machine pulsates at a frequency which is equal to twice the frequency of the current induced at the same time in the secondary or field circuit of the machine.

Also I have observed that during each armature current pulsation, which occurs once during each half cycle of slip, both the magnitude and phase of the armature current vary over ranges which are different at each subsynchronous speed. These changes in the magnitude and phase of the motor armature current may be seen more clearly from Fig. 2 which is a polar diagram of the current in one phase of the motor armature winding at two different subsynchronous speeds. In this Fig. 2 $I_1$ is the locus of the end of the armature phase current vector during each armature current pulsation while the motor is operating at a predetermined subsynchronous speed and $I_2$ is the locus of the end of the same current vector during each armature current pulsation while the motor is operating at a higher predetermined subsynchronous speed. The locus of the same current vector at any other constant subsynchronous speed may be represented by a similar circle displaced relatively to the loci $I_1$ and $I_2$. These loci, therefore, clearly show that the ranges over which the magnitude and phase of the motor armature current vary are different at different subsynchronous speeds. However, at those speeds near synchronous speed from which a heavily loaded synchronous motor can be pulled into synchronism, I have observed that the ranges over which the magnitude and phase of the motor armature current vary do not differ from each other as much as they do at lower subsynchronous speeds, but the length of time of each current pulsation differs materially at these synchronizing speeds. For example, each armature current pulsation when the motor is operating at 98% of synchronous speed is 50% longer than each armature current pulsation when the motor is operating at 97% of synchronous speed.

In accordance with the preferred embodiment of my invention, I provide an arrangement which depends for its operation upon the changes in the ranges over which the armature current pulsates as the motor speed increases and also upon the length of time or frequency of each pulsation. For accomplishing these results in the particular embodiment of my invention shown in Fig. 1 I provide a single phase wattmetric relay 15 having a current winding 16 energized in response to the current in one of the phase conductors supplying current to the motor armature current 2 and a voltage winding 17 connected in series relation with suitable impedance means such as a resistor 23 across one of the phases of the supply circuit 4. In a manner well known in the art, the currents in the two windings 16 and 17 cause a torque to be produced on the movable element of the relay which is a function of the product of the voltage of the supply circuit 4 and the motor armature current and the phase displacement between them.

The relay 15 is also provided with suitable adjustable biasing means such as a spring 26 for exerting a torque in a predetermined direction on the movable element of the relay. By changing the phase relation between the currents in the windings 16 and 17 in any well known manner as for example by varying the electrical constants of one or both of the circuits of the windings 16 and 17 the zero torque characteristic which is substantially a straight line can be made to have any desired slope such as BB' or CC' and by varying the torque exerted by the biasing means the distance of this zero torque characteristic from the origin can be adjusted to any desired value. For the purpose of this description it will be assumed that the windings 16 and 17 of the relay 15 are so connected that BB' is the zero torque characteristic of the relay when the resistor 23 is connected in series with the voltage winding 17 and that when the magnitude and phase of the armature current are such that the phase current vector terminates to the right of the characteristic BB' the resultant torque on the movable element of the relay is in a direction to open contacts 19 and close contacts 18 and when the magnitude and phase of the armature current are such that the phase current vector terminates to the left of the characteristic BB' the resultant torque on the movable element of the relay is in a direction to open contacts 18 and close contacts 19. The biasing means 26 exerts a torque in a direction to maintain the contacts 19 closed. Consequently, these contacts 19 are closed when the relay 15 is deenergized.

In the embodiment of my invention shown in Fig. 1 not only must the resultant torque of the relay 15 be in a direction to close contacts 19 but also the torque in said direction to close contacts must exist for a predetermined time. This result is accomplished by also controlling the opening of the contacts 18 and the closing of the contacts 19 by suitable timing means such as a dash pot 33. Therefore, not only must the motor speed increase so that the armature current vector terminates to the left of the zero torque characteristic BB' during a portion of each armature current pulsation but also it must increase to that particular subsynchronous speed which produces an armature current pulsation of such a low frequency that the end of the current vector remains to the left of the zero torque characteristic for a sufficient length of time to allow the relay 15 to close its contact 19.

Associated with the relay 15 is an auxiliary time relay 20 which is arranged to be energized by the closing of the contacts 18 of the relay 15 when the line switch 5 is closed and the field switch 11 is open. After the relay 20 has been energized for a predetermined time, it closes its contacts 21 and 25. The closing of contacts 25 completes a shunt circuit around the contacts 18 of the relay 15 so that the relay 20 is not deenergized by the subsequent opening of the contacts 18 while the field switch 11 is open. The contacts 21 are in series with the contacts 19 of relay 15 in the energizing circuit for the operating coil 14 of the field switch 11. Therefore, it is necessary for the relay 15 first to close its contacts 18 and then close its contacts 19 before the field switch 11 can be closed. In this manner, the presence of starting current is checked before the field switch 11 is closed.

Since it is desirable to remove excitation from the motor 1 as soon as it falls out of synchronism instead of waiting until the motor speed has decreased to the same value at which field is applied, I provide in accordance with my invention suitable means whereby the relay 15 responds to a different function of the supply circuit voltage and armature current after the field switch 11 closes than it responds to when effecting the closing of the field switch 11. This result is obtained in the particular embodiment of my invention shown in Fig. 1 of the drawing by having the field switch 11, when it is closed, change the impedance of the circuit of the voltage winding 17 of the relay 15 by increasing the portion of the reactance 22 and short-circuit a portion of the resistance 23 in series with the voltage winding 17. In this manner the constants of the circuit of the voltage winding 17 are changed so that the relay 15 has a different zero torque characteristic, such as AA' for example. It will be obvious to those skilled in the art, however, that the desired shift in the phase relation between the currents in the windings 16 and 17 may be effected in many of the well known ways. For example, this result may be obtained by changing the connection of the voltage winding 17 as shown in Fig. 3 or by connecting a capacitor 34 in parallel with the resistor 23 and having the field switch 11, when closed, complete a shunt circuit around the parallel connected capacitor and resistor.

The operation of the embodiment of my invention shown in Fig. 1 is as follows: When it is desired to start the motor 1, the switch 7 is closed to complete through the contacts of the switch 8 an energizing circuit for the closing coil 6 of the switch 5. The closing of the switch 5 connects the armature winding 2 of the motor 1 directly across the supply circuit 4 so that the motor starts as an induction motor. The motor armature current that flows as soon as the switch 5 is closed is of sufficient magnitude and lags the supply circuit voltage sufficiently to cause the relay 15 to open its contacts 19 and close its contacts 18. By closing its contacts 18, the relay 15 completes through the auxiliary contacts 24 on the switch 5 and the contacts 31 on the field switch 11 an energizing circuit for the operating coil of relay 20. After the operating coil of relay 20 has been energized for a predetermined time, it closes its contacts 21 and 25. By closing its contacts 25, relay 20 completes a shunt circuit around the contacts 18 of relay 15 so that the subsequent opening of these contacts 18, while the contacts 24 and 31 remain closed, does not effect the deenergization of relay 20. As long as the motor speed is below a predetermined value, the current magnitude and phase angle relation are of proper value, and the frequency of the pulsations of the armature current is sufficiently high to prevent the relay 15 from closing its contacts 19. However, when the motor reaches a predetermined speed, the current magnitude and phase angle relation and the frequency of the current pulsations become such as to permit the relay 15 to close its contacts 19. A circuit is then completed for the operating coil 14 of the field switch 11 through the contacts 19 of relay 15 and contacts 21 of relay 20. The switch 11 then closes to connect the motor field winding 3 to the source of excitation 10 so that the motor is pulled into synchronism. By opening its contacts 12 the field switch 11 disconnects the discharge resistor from across the field winding 3. By opening its contacts 31 the field switch 11 effects the deenergization of the relay 20 which opens its contacts 21 and 25. The field switch 11, however, by closing its contacts 32 in shunt with the contacts 21 of relay 20 prevents the closing coil 14 from being deenergized when the contacts 21 open.

In order that the switch 11 may not be opened due to the relay 15 operating in response to current disturbances produced in the armature circuit of the motor while the motor is pulling in synchronism, the field switch 11 is arranged to complete through its contacts 27 and 28 a short circuit around the contacts 19 of the relay 15 for a predetermined time after the switch 11 closes. The contacts 27 are closed as soon as the switch 11 closes and the contacts 28 are arranged in any well known manner so that they are opened after the switch 11 has been closed for a predetermined time.

By closing its contacts 29 and opening its contacts 30, the field switch 11 changes the constants in the circuit of the voltage winding 17 so that the relay 15 responds to a predetermined phase relation between the armature current and voltage after the switch 11 closes.

As long as the motor 1 is operating in synchronism with the source supplying current to the supply circuit 4, the phase relation between the current and voltage of the motor is such that the relay 15 maintains its contacts 19 closed so that the field switch 14 remains closed. When, however, the motor 1 falls out of synchronism, the phase relation between the current and voltage becomes sufficiently lagging to cause relay 15 to open its contacts thereby effecting the deenergization of the closing coil 14 of the field switch 11. The switch 11 then opens to disconnect the field winding 3 from the source of excitation 10.

When the motor again reaches a speed near synchronous speed, the relay 15 closes its contacts 19 and effects, in the manner above described, the closing of the field switch 11 to reconnect the field winding 3 to the source of excitation 10.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:

1. In combination, an alternating current supply circuit, a dynamo-electric machine connected to said supply circuit, and speed responsive means dependent on the frequency of the pulsations produced in a predetermined function of the product of said supply circuit voltage and the current flowing between said supply circuit and said machine by said machine when operating out of synchronism.

2. In combination, an alternating current supply circuit, a synchronous machine connected to said supply circuit, and speed responsive means dependent on the frequency of the pulsations produced in a predetermined function of the product of said supply circuit voltage and the current flowing between said supply circuit and said machine by said machine when operating at a subsynchronous speed for effecting a predetermined electric connection for said machine when the speed of the machine increases to a predetermined value.

3. In combination, an alternating current supply circuit, a synchronous motor having an armature connected to said supply circuit, a field winding for said motor, a source of excitation, and speed responsive means dependent on the frequency of the pulsations produced in a predetermined function of the product of said supply circuit voltage and the current flowing between said supply circuit and said motor by said motor when operating below synchronous speed for effecting the connection of said field winding to said source when the motor speed is above a predetermined value.

4. In combination, an alternating current supply circuit, a synchronous machine connected to said supply circuit, and speed responsive means controlled in accordance with a predetermined function of the product of the supply circuit voltage and the current flowing between the supply circuit and the machine and dependent on the frequency of the current pulsations produced between said supply circuit and said machine when said machine is operating out of synchronism.

5. In combination, an alternating current supply circuit, a synchronous motor having an armature connected to said supply circuit, a field winding for said motor, a source of excitation, and speed responsive means controlled in accordance with a predetermined function of the product of the supply circuit voltage and the motor armature current and dependent on the frequency of the current pulsations produced between said supply current and motor armature winding when said motor is operating out of synchronism for effecting the connection of said field winding to said source when the motor speed increases above a predetermined value.

6. In combination, a polyphase supply circuit, a polyphase synchronous motor connected to said circuit, a source of excitation and speed responsive means for connecting said source to the field winding of said motor when the speed of said motor is above a predetermined value including a single phase wattmetric device controlled in accordance with the phase relation between a single phase voltage of said circuit and a single phase current flowing between said circuit and motor and dependent on the frequency of the pulsations of the motor armature current.

7. In combination, an alternating current supply circuit, a synchronous motor having an armature connected to said supply circuit, a field winding for said motor, a source of excitation, and speed responsive means controlled in accordance with a predetermined function of the supply circuit voltage and the motor armature current for effecting the connection of said field winding to said source when the motor speed is above a predetermined value and in accordance with a different predetermined function of the supply circuit voltage and the motor armature current for effecting the disconnection of said field winding from said source when said motor falls out of synchronism.

8. In combination, a polyphase supply circuit, a polyphase synchronous motor connected to said circuit, a source of excitation and speed responsive means for controlling the connections between said source and the field winding of the motor including a single phase wattmetric device having a voltage winding connected to one phase of said supply circuit and a current winding connected in series relation with one phase of the motor armature winding, and means for varying the electric constants of the circuit of one of said relay windings when said source of excitation is connected to the motor field winding.

9. In combination, a polyphase supply circuit, a polyphase synchronous motor connected to said circuit, a source of excitation, a field switch for connecting said source to the field winding of said motor, and means for effecting the closing of said field switch when the motor speed is above a predetermined value and for opening said field switch when the motor falls out of synchronism including a single phase wattmetric device having a voltage winding connected to one phase of said supply circuit and a current winding connected in series relation with one phase of the armature winding of said motor, and means responsive to the closing of said field switch for changing the connections of one of the windings of said device so that it responds to a different function of the supply circuit voltage and motor armature current when the field switch is open than it responds to when the field switch is closed.

10. In a control system for resynchronizing a synchronous motor, in combination a synchronous motor having an armature winding and a field winding, starting and running connections for the field winding, and means responsive to certain characteristics in the armature current caused by a temporary overload sufficient in magnitude and period of action to establish said starting connections and responsive to modulations in a function of the armature current to reestablish the running connections.

11. In combination, a synchronous motor having an armature winding and a field winding, starting and running connections for one of said windings, and means dependent upon the modulations in a predetermined function of the current in the armature winding when said starting connections are established for effecting the establishment of said running connections and controlled by a predetermined characteristic of the current in said armature winding when said running connections are established for effecting the reestablishment of said starting connections.

12. In combination, a synchronous motor having an armature winding and a field winding, starting and running connections for one of said windings, a relay dependent upon the modulations of the current in said armature winding when said starting connections are established and controlled by a predetermined characteristic of said current when said running connections are established, and means controlled by said relay for effecting the disconnection of the starting connections and the establishment of said running connections under certain operating conditions of said motor and for effecting disconnection of said running connections and the reestablishment of said starting connections under other operating conditions of said motor.

13. In combination, a synchronous motor having an armature winding and a field winding, starting and running connections for one of said windings, means responsive to frequency of the modulations in a predetermined function of the current in the armature winding of said motor when said starting connections are established for establishing said running connections when the motor speed is above a predetermined value and means responsive to predetermined current conditions in the armature winding of said motor for reestablishing said starting connections when said running connections are established and the motor falls out of step.

14. In combination, a synchronous machine having an armature winding and a field winding, means for supplying alternating current to said armature winding, a source of excitation, and means dependent upon the frequency of the armature current pulsations and the phase and magnitude ranges over which the armature current varies during the armature current pulsations while said machine is operating subsynchronously for controlling the connection between said field winding and said source of excitation.

15. In combination, a synchronous machine having an armature winding and a field winding, means for supplying alternating current to said armature winding, a source of excitation, and means responsive to the armature current remaining within predetermined phase and magnitude ranges for a predetermined time during an armature current pulsation of said machine while operating subsynchronously for effecting the connection of said source of excitation to said field winding.

16. In combination, a synchronous machine having an armature winding and a field winding, means for supplying alternating current to said armature winding, a source of excitation, means dependent upon the frequency of the armature current pulsations and upon the phase and magnitude ranges over which the armature current varies during the current pulsations while said machine is operating subsynchronously for effecting the connection of said field winding to said source of excitation, and means responsive to a predetermined function of the product of the voltage of said supply circuit and the armature current of said machine when said machine is pulled out of step for effecting the disconnection of said field winding from said source of excitation.

17. In combination, an alternating current supply circuit, a synchronous motor having an armature winding connected to said supply circuit, a field winding for said motor, a source of excitation, and means controlled by a predetermined function of the product of the supply circuit voltage and motor armature current for effecting the connection of said source of excitation to said field winding and by a different predetermined function of said product for effecting the disconnection of said source of excitation from said field winding.

18. In combination, a polyphase supply circuit, a polyphase synchronous motor connected to said circuit, a source of excitation, and a wattmetric relay controlled in accordance with a predetermined phase relation of the current and voltage of said circuit for effecting the connection of said source of excitation to the field winding of said motor and in accordance with a different phase relation of the current and voltage of said circuit for effecting the disconnection of said source of excitation from said field winding.

19. In combination, a polyphase supply circuit, a polyphase synchronous motor connected to said circuit, a source of excitation, and a wattmetric relay controlled in accordance with a predetermined phase relation of the current and voltage of said circuit for effecting the connection of said source of excitation to the field winding of said motor, means responsive to the connection of said source of excitation to the motor field winding for changing the connection of said wattmetric relay so that it is controlled in accordance with a different phase relation of the current and voltage of said circuit, and means controlled by said wattmetric relay when said source of excitation is connected to the motor field winding for disconnecting said sorce of excitation from the motor field winding.

20. In combination, a synchronous motor having a field winding, a source of excitation, a field switch for connecting said source to said field winding, a control switch, means responsive to the closure of said control switch for a predetermined time for closing said field switch and maintaining it closed for a predetermined time interval thereafter independently of the position of said control switch, and means for effecting the immediate opening of said field switch in response to an opening of said control switch after the expiration of said predetermined time interval.

21. In combination, a synchronous motor having a field winding, a source of excitation, a field switch for connecting said source to said field winding, a control switch, means dependent upon the speed of said motor for opening and closing said control switch, means responsive to the closure of said control switch for a predetermined time for closing said field switch and maintaining it closed for a predetermined time interval thereafter independently of the position of said control switch, and means for effecting the immediate opening of said field switch in response to an opening of said control switch after the expiration of said predetermined time interval.

22. In combination, a synchronous motor having a field winding, a source of excitation, a field switch for connecting said source to said field winding, a control switch, means dependent upon a predetermined function of the motor armature current and voltage for closing said control switch and another predetermined function of the motor armature current and voltage for opening said control switch, means responsive to the closure of said control switch for a predetermined time for closing said field switch and maintaining it closed for a predetermined time interval thereafter independently of the position of said control switch, and means for effecting the immediate opening of said field switch in response to an opening of said control switch after the expiration of said predetermined time interval.

23. In combination, a polyphase supply circuit, a polyphase synchronous machine connected to said circuit, a source of excitation, and means for controlling the connections between said source and the field winding of said machine including a wattmetric relay having a voltage winding responsive to the voltage of said supply circuit and a current winding responsive to the armature current of said machine, and means for controlling the circuits of said relay windings so that said relay has a different zero torque characteristic when said source is disconnected from the field winding of said machine than when said source is connected to said field winding.

24. In combination, a polyphase supply circuit, a polyphase synchronous machine connected to said circuit, a source of excitation, and means for controlling the connections between said source and the field winding of said machine including a wattmetric relay having a voltage winding responsive to the voltage of said supply circuit and a current winding responsive to the armature current of said machine, and means for controlling the electrical constants of the circuit of one of said relay windings so that said relay has a different zero torque characteristic when said source is disconnected from the field winding of said machine than when said source is connected to said field winding.

ARVID E. ANDERSON.